July 1, 1930.  A. K. SMITH ET AL  1,768,797
PURIFICATION OF MAGNESIUM CHLORIDE
Filed Oct. 13, 1923
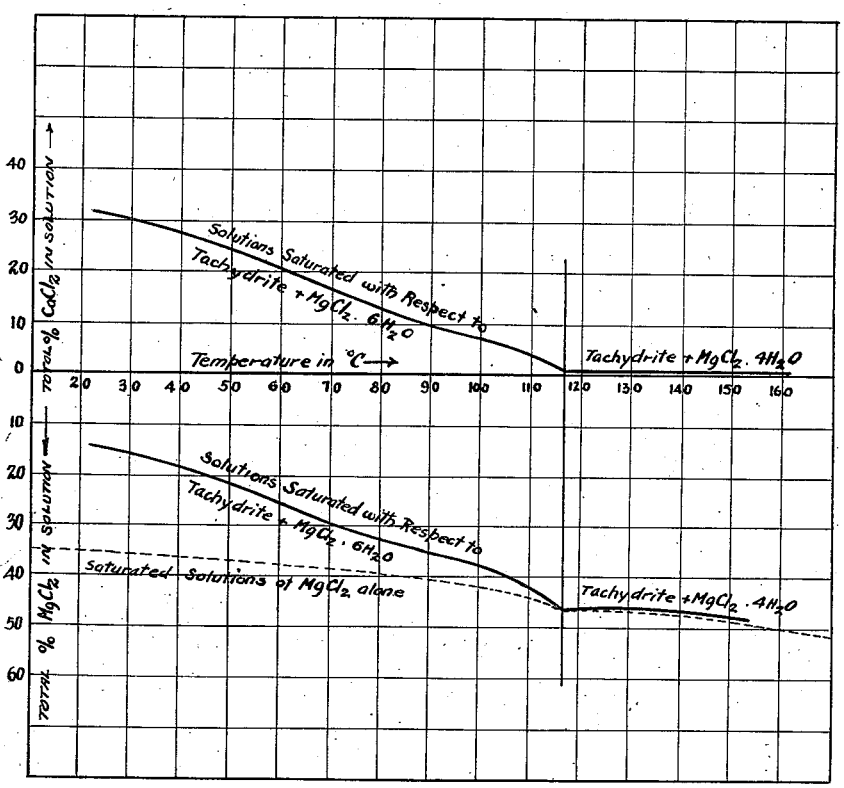
INVENTOR.
Albert Kelvin Smith.
BY Carl F. Prutton and
Fay, Oberlin & Fay
ATTORNEYS Patented July 1, 1930

1,768,797

UNITED STATES PATENT OFFICE

ALBERT KELVIN SMITH, OF MIDLAND, MICHIGAN, AND CARL F. PRUTTON, OF EAST CLEVELAND, OHIO, ASSIGNORS TO THE DOW CHEMICAL COMPANY, OF MIDLAND, MICHIGAN, A CORPORATION OF MICHIGAN

PURIFICATION OF MAGNESIUM CHLORIDE

Application filed October 13, 1923. Serial No. 668,356.

In our co-pending application filed September 29, 1923, Serial No. 665,737, Patent No. 1,627,068, there is disclosed an improved method or process for treating brines which contain calcium and magnesium chlorides, with the object of separating the latter from each other. Incidentally to such process the calcium and magnesium chlorides, at least in part, are crystallized out of the solution in the form of the double salt known as tachydrite ($CaCl_2.2MgCl_2.12H_2O$), which contains approximately 25 per cent calcium chloride and 32 per cent magnesium chloride. After separating such crystals from the mother liquor, the crystals are mixed with a limited amount of water and under controlled temperature conditions, i. e. as stated, the temperature should not fall below 22° C. nor rise above 50° C., so as to dissolve the calcium chloride of the tachydrite, leaving behind crystals that contain approximately 5 per cent calcium chloride and 42 per cent magnesium chloride. It then becomes necessary, in order to effect a complete separation, to purify these last mentioned crystals of the small content of calcium chloride included therewith, as just noted, and the present process constitutes one of the several alternative methods we have devised for this purpose.

As a matter of fact, the present process may be regarded as one generally adapted for the purification of magnesium chloride from calcium chloride admixed therewith in amounts substantially as stated or varying therefrom, so long as the molecular proportion of such calcium chloride to magnesium chloride is less than in tachydrite, i. e. less than one to two.

To the accomplishment of this and related ends, the invention then consists of the steps hereinafter fully described and particularly pointed out in the claims, the annexed drawing and the following description setting forth in detail one approved method of carrying out the invention, such disclosed mode, however, constituting but one of the various ways in which the principle of the invention may be used.

In said annexed drawing:—

The single figure there appearing is a diagram whereon the relative saturation points of magnesium chloride and other compounds involved in the process at different temperatures are shown by appropriate curves.

The point of the process of present interest is that the solution from which the last of the tachydrite crystals are separated is approximately saturated with respect to magnesium chloride containing four molecules of water of crystallization ($MgCl_2.4H_2O$), this being the stable phase for the compound in question at temperatures above 117 degrees C. The percentage of calcium chloride in solution simultaneously saturated with tachydrite and magnesium chloride decreases with rise in temperature to a minimum at 117 degrees C., being less than one-tenth of one per cent at the temperature stated. Moreover, the percentage of such calcium chloride in solution increases only slightly at temperatures slightly above 117 degrees C., such percentage rising for example to only one-half of one per cent at 150 degrees C. The filtration step, hereinafter described, is preferably effected at a temperature somewhat higher than 117 degrees C. because of the fact that the saturated solution at the last mentioned temperature is very nearly at the solidification point, but it will be seen that the solubility of the calcium chloride is not materially increased so long as the temperature is kept below 150 degrees C.

If the total percentage of calcium chloride in solutions, which are simultaneously saturated with magnesium chloride containing six molecules of water of crystallization ($MgCl_2.6H_2O$) and tachydrite, is plotted against temperature, the curve as represented by the upper curve on the diagrammatic figure will slope rapidly towards the temperature axis, nearly meeting it at the point corresponding with 117 degrees C. At this point there is a sharp break in the curve and from there on the latter rises gradually, staying below one-half of one per cent up to 150 degrees C., as already explained.

The lower curve in the same diagram represents the total percentage of magnesium chloride in the same solutions, the same temperature axis being used and the same origin. The dotted curve shows the solubility of magnesium chloride alone in water. It will be seen from the last mentioned curve that up to 117 degrees C. the stable phase is magnesium chloride containing six molecules of water ($MgCl_2.6H_2O$). At that temperature there is a break in the curve, the further portion being the curve for magnesium chloride with four molecules of water ($MgCl_2.4H_2O$). The lower solid line similarly represents the percentage of magnesium chloride in solution simultaneously saturated with tachydrite and magnesium chloride. This curve slopes down rapidly to very nearly meet the magnesium chloride solubility curve at 117 degrees C. and from that point slopes gradually away from the magnesium chloride solubility curve.

Having regard to the foregoing conditions as to relative solubilities of the compounds involved, we take the magnesium chloride crystals, (or equivalent solution), containing calcium chloride as an impurity in approximately the proportions hereinbefore stated, i. e. the molecular proportion of such calcium chloride to magnesium chloride being less than one to two, melt them down and evaporate them under atmospheric pressure until the boiling point of the solution is between 160 and 162 degrees C. This mixture is then cooled and filtered at a temperature between 117 and 130 degrees C., as the result of which the calcium chloride is separated in the form of tachydrite crystals, leaving substantially pure magnesium chloride behind as the mother liquor.

While we prefer to keep within the ranges of temperature for boiling and cooling that are mentioned above, because crystals are more readily separated from the magnesium chloride solution between 117 and 130 degrees C. than at higher temperatures, we may, if we desire, boil to any higher temperature up to saturation with $MgCl_2.4H_2O$; in which case the temperature to which it is necessary to cool the mixture to obtain approximate saturation with $MgCl_2.4H_2O$ will be raised, no cooling at all being required where the boiling is carried to the saturation point. The cooling step may also be avoided by evaporating under reduced pressure such that the final temperature of the solution at the end of the boiling operation gives a solution approximately saturated with $MgCl_2.4H_2O$.

It will be understood, that, where only approximate purity is required in the case of the magnesium chloride product, the conditions hereinbefore given as to temperature, etc. need be approached only to a corresponding degree. In other words, the water content is reduced until, at the temperature at which the tachydrite crystals are separated from the solution, the calcium chloride remaining in solution is reduced to the extent desired.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of purifying magnesium chloride containing a small amount of calcium chloride, the steps which consist in evaporating a solution of such chlorides in water until a boiling point of approximately 160° Cent. at atmospheric pressure is reached, cooling to a temperature not below 117° and separating out the resulting tachydrite crystals.

2. In a method of purifying magnesium and calcium chlorides, the steps which consist in evaporating a solution containing such chlorides to the point where said chlorides crystallize out in the form of tachydrite, separating the latter from the mother liquor, dissolving the major portion of the calcium chloride of such tachydrite in a small quantity of water, melting the residual crystals of magnesium chloride and included small content of calcium chloride and evaporating until a boiling point of approximately 160° Cent. at atmospheric pressure is reached, cooling to a temperature of approximately 117° Cent., and separating out the resulting tachydrite crystals.

3. In a method of purifying magnesium chloride containing a small amount of calcium chloride, the steps which consist in bringing the material to a temperature of at least 117° C. and to such a concentration that a mixture of tachydrite crystals and a concentrated solution of magnesium chloride is formed, and then separating said crystals from the magnesium chloride solution.

4. In a method of purifying magnesium chloride containing a small amount of calcium chloride, the steps which consist in evaporating a solution of such chlorides in water to such a strength that on cooling to a temperature above 116° C. tachydrite crystals separate out; cooling to a temperature above 116° C. and separating the resulting tachydrite crystals from the remaining magnesium chloride solution.

5. In a method of purifying magnesium chloride containing a small amount of calcium chloride, the steps which consist in concentrating a solution of said chloride in water at a temperature above 117° C., obtaining a mixture of tachydrite crystals and magnesium chloride solution, and then separating said crystals from the solution.

6. In a method of purifying magnesium chloride containing a small amount of calcium chloride, the steps which consist in concentrating under reduced pressure at a temperature between 117° and 150° C., a solution of said chlorides in water until such solution is approximately saturated with respect to magnesium chloride containing four molecules of water of crystallization, and then separating out the resulting crystals of tachydrite from the magnesium chloride remaining in solution.

7. In a method of purifying magnesium chloride containing a small amount of calcium chloride, the steps which consist in concentrating under reduced pressure at a temperature of approximately 120° C., a solution of said chlorides in water until such solution is approximately saturated with respect to magnesium chloride containing four molecules of water of crystallization, and then separating out the resulting crystals of tachydrite from the magnesium chloride remaining in solution.

Signed by me, this 26th day of September, 1923.

ALBERT KELVIN SMITH.

Signed by me, this 26th day of September, 1923.

CARL F. PRUTTON.